United States Patent [19]
Wilson et al.

[11] Patent Number: 5,369,501
[45] Date of Patent: Nov. 29, 1994

[54] FACSIMILE TRANSMISSION IN AN RF DIGITAL COMMUNICATION SYSTEM

[75] Inventors: Timothy J. Wilson, Schaumburg; Nimrod Averbuch, Buffalo Grove, both of Ill.

[73] Assignee: Motorola, Inc., Schaumburg, Ill.

[21] Appl. No.: 993,992

[22] Filed: Dec. 21, 1992

[51] Int. Cl.$^5$ .......................... H04N 1/00; H04N 1/32
[52] U.S. Cl. .................................. 358/407; 358/400; 379/100
[58] Field of Search ............... 358/407, 400, 405, 401; 379/58, 61, 63, 100; 455/54.1, 39, 74; H04N 1/00, 1/32

[56] References Cited
U.S. PATENT DOCUMENTS
5,210,785  5/1993  Sato et al. .............................. 379/58

*Primary Examiner*—Edward L. Coles, Jr.
*Assistant Examiner*—Jerome Grant, II
*Attorney, Agent, or Firm*—Timothy W. Markison

[57] ABSTRACT

Protocol convertors associated with a mobile facsimile device and a fixed-end facsimile device are used to terminate the control data and image data protocols unique to each device. The protocol convertors interface with a digital RF communication system using a radio link protocol to ensure the error-free transmission of facsimile data.

13 Claims, 2 Drawing Sheets

FACSIMILE TRANSMISSION IN AN RF DIGITAL COMMUNICATION SYSTEM

FIELD OF THE INVENTION

The present invention relates generally to RF (radio frequency) digital communication networks, and in particular, to the transmission of facsimile data therein.

BACKGROUND OF THE INVENTION

The use of fixed (stationary) facsimile devices for the transmission of image data through the PSTN (Public Switched Telephone Network) environment is known. Such fixed facsimile devices adhere to a set of protocol standards specifically designed for use in the relatively low error and low delay environment of the PSTN. In particular, one protocol specifies the manner in which the digitally represented control data is handled; another protocol specifies the manner in which the digitally represented image data is handled.

The use of analog RF communication systems, operably coupled to the PSTN, for the transmission of facsimile data between fixed facsimile devices and mobile facsimile devices is also known. Such systems use the analog RF communication system as an extension of the PSTN environment; the modem signals generated by facsimile devices and transmitted within the PSTN are also transmitted through the voiceband path of the analog RF communication system. Naturally, modem signals transmitted in such a manner are also subject to the noise and fading conditions inherent in any type of RF communication system. Thus, just as a voice message through such a system may be corrupted, the digital facsimile data represented by modem signals may also be corrupted, leading to poor recreation of the transmitted image.

Digital RF communication systems offer an alternative for the transmission of facsimile data. While such systems are also susceptible to the noise and fading conditions present in other RF communication systems, they are capable of offering protection against errors in the digital information in the form of error correction codes. The amount of error protection offered is limited in part by the available data bandwidth of such a system. Also, digital RF communication systems typically present larger delays to the transmission of message data than might be found in analog communication systems. Typically, the addition of error correction codes only add to this delay.

Attempts have been made to incorporate the protocol standards used within the PSTN directly into digital RF communication systems. It has been determined, however, that such an approach is less than satisfactory at producing acceptable image reproduction. In particular, the PSTN-based image data transfer protocol is particularly sensitive to errors; a single error can destroy an entire scan line within the image data. Error correction techniques can be used to ensure the integrity of the image data. However, such techniques often produce delays that violate timing parameters specified by the PSTN-based control data transfer protocol. For example, the GSM (Group Specialized Mobile) 3.45 standard for the transmission of facsimile data within a digital RF communication system was found to produce unacceptable image quality. The subsequent GSM 3.46 standard is extremely complex and timing sensitive, as well as non-transparent to the facsimile devices used. Therefore, a need exists for a solution that allows transparent transmission of facsimile data, with respect to the facsimile device, through a digital RF communication system, and having acceptable image quality.

DESCRIPTION OF A PREFERRED EMBODIMENT

The present invention provides a method for substantially error-free bi-directional transmission of facsimile information between a mobile facsimile device and a fixed-end (land-based) facsimile device. The mobile facsimile device may be a personal computer (PC) running off-the-shelf facsimile software, or a commonly used Group 3 facsimile device. A Group 3 facsimile device is a facsimile device which operates according to the specifications set forth in CCITT (Consultative Committee On Telephony and Telegraphy) guidelines and standards. The fixed-end facsimile device may be a Group 3 facsimile device connected to the public switched telephone network (PSTN). Communications between the mobile and fixed-end facsimile devices are facilitated through the use of protocol convertors. Associated with both the mobile facsimile device and the fixed-end facsimile device, the protocol convertors allow the error-sensitive control data and image data protocols unique to either facsimile device to be terminated in a transparent fashion. That is, from the viewpoint of either the mobile facsimile device or the fixed-end facsimile device, operation is allowed to proceed as normal. Also, an RF (radio frequency) communication path set up between the protocol convertors allows the relevant facsimile data to be transmitted in an error-free manner. Thus, from the end user's point of view, transparent facsimile transmission is established.

Figure 1:
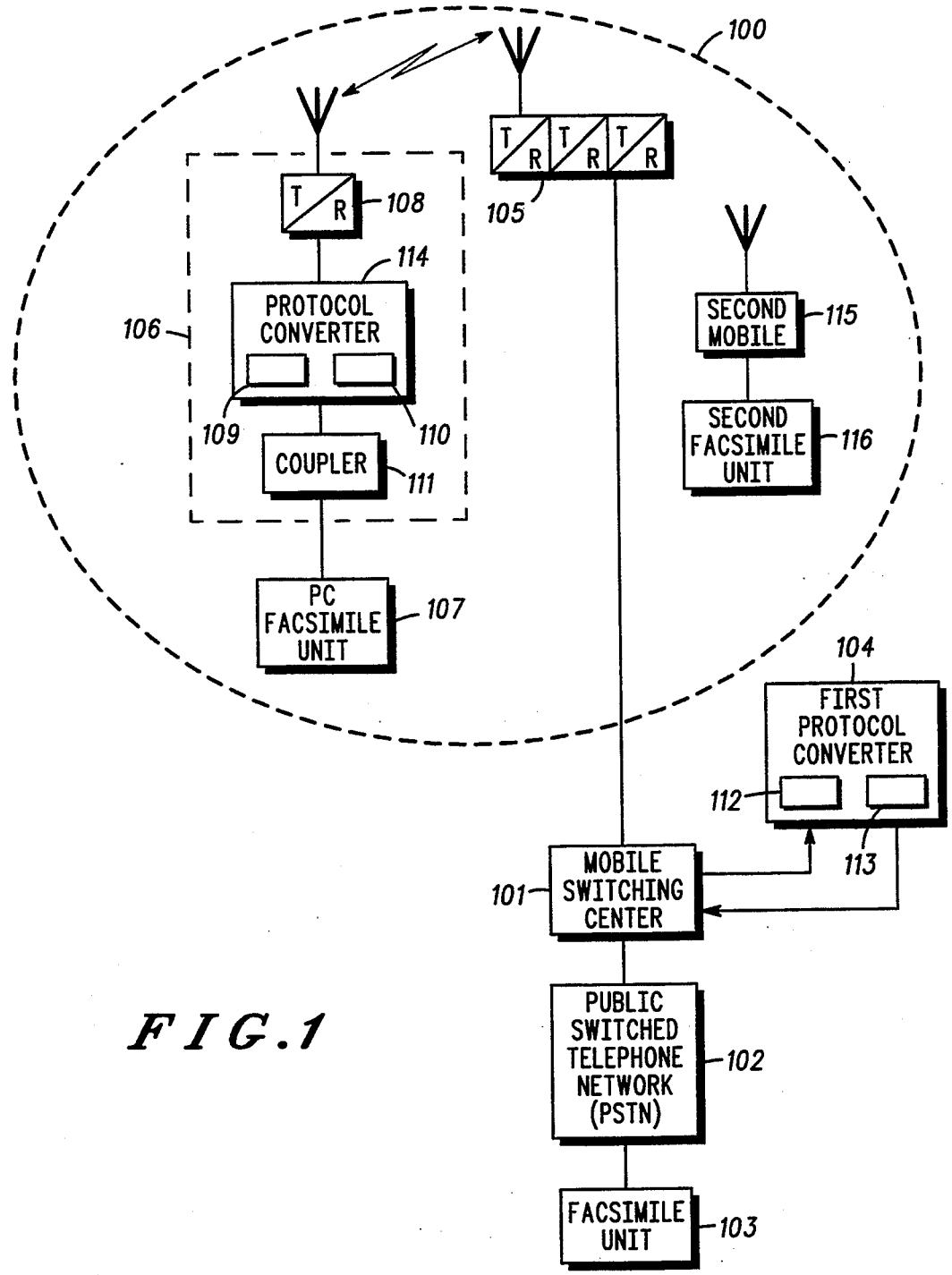
FIG. 1 illustrates a communication system capable of facsimile transmission in accordance with the present invention.
Figure 2:
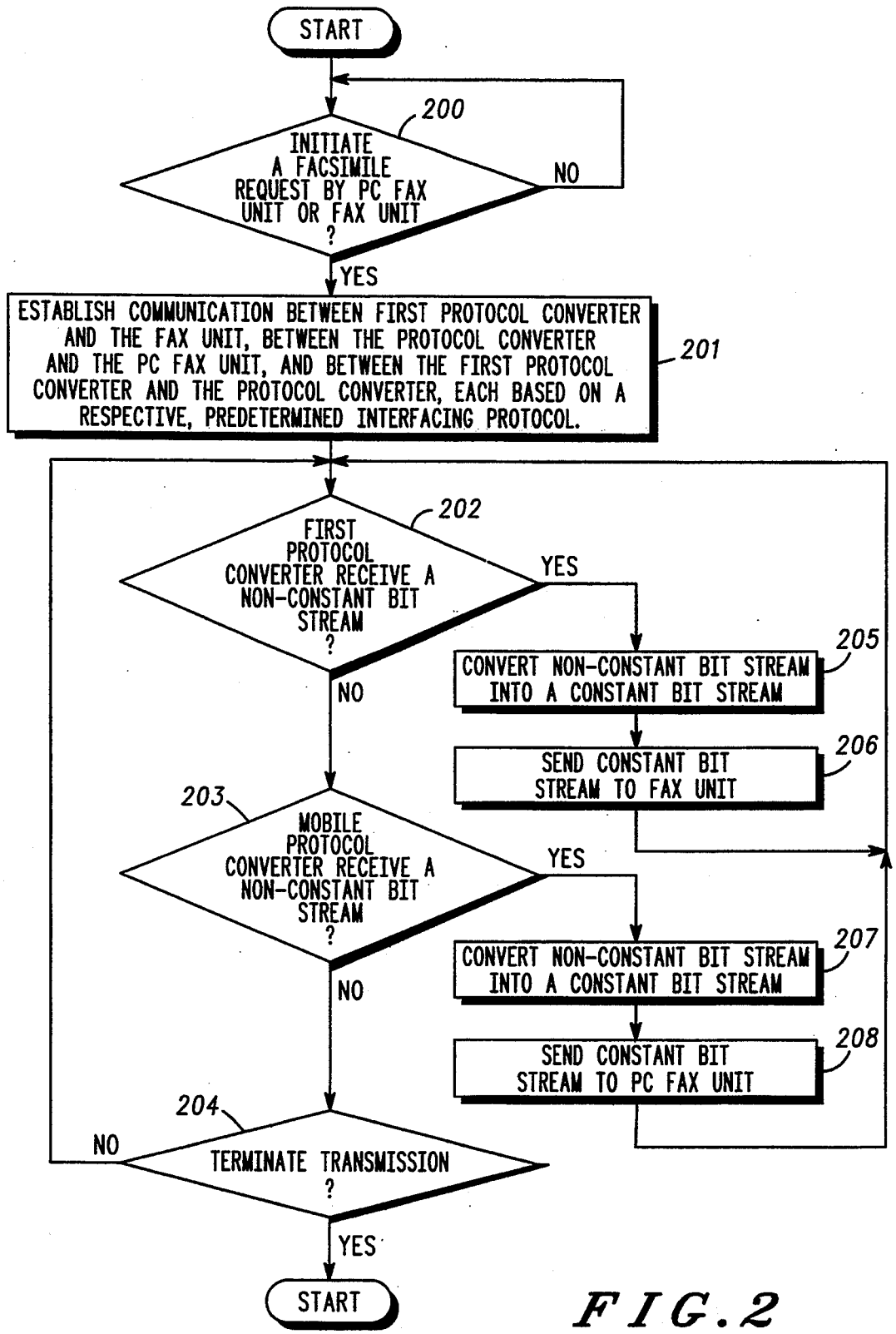
FIG. 2 illustrates a logic diagram which may be used to implement the present invention.

The present invention can be more fully understood with reference to FIGS. 1 and 2. FIG. 1 illustrates an RF coverage area 100, a mobile switching center (MSC) 101, a PSTN 102, a facsimile unit 103, a first protocol convertor 104, a base site 105, a mobile 106, a PC facsimile unit 107, a transceiver 108, microprocessors 109 and 112, memory devices 110 and 113, a coupler 111, a protocol convertor 114, a second mobile 115, and a second facsimile unit 116. The RF coverage area 100 is provided by the base site 105, which may comprise transmit and receive radio equipment. The RF coverage area 100 may comprise one such coverage area from a plurality of coverage areas as would be found in a wide-area communication system, such as a cellular communication system. Each base site provides a limited number of wireless communication resources, hereafter referred to as channels, within the coverage area of the site.

The mobile 106 may comprise an in-car radio capable of RF communications with the base site 105. The coupler 111 may comprise a point of connection from the mobile 106 to the PC facsimile unit 107. The microprocessors 109 and 112 may each comprise a Motorola HC16 microprocessor and/or a Motorola 68030 microprocessor.

The PC facsimile unit 107 may comprise an ordinary personal computer running an off-the-shelf facsimile software package such as DosFax Pro or a commonly used Group 3 facsimile device. The facsimile unit 103 may comprise a commonly used Group 3 facsimile device.

The mobile switching center 101 is operably coupled to the base site 105 and the PSTN 102. As is known, the main function of the mobile switching center 101 is to support telephone and data calls by appropriately connecting channels to PSTN 102 circuits. Calls are established and released by the mobile switching center 101 in response to requests made by mobile units and the PSTN 102. If a mobile initiates a call, the call is termed a mobile originated call while calls initiated by the facsimile unit 103, via the PSTN 102, are called mobile terminated calls.

The mobile switching center 101 is also coupled to a first protocol converter 104. If a particular call is to be used for facsimile information transmission, the mobile switching center 101 connects the first protocol converter 104 to the PSTN 102 circuit and to the channel being used for the call. Thus, while a facsimile call is in progress, the first protocol converter 104 is logically coupled to the channel and the PSTN 102.

FIG. 2 illustrates a logic diagram which may be used to implement the present invention. In particular, FIG. 2 outlines the procedures necessary for mobile originated and mobile terminated facsimile transmission calls. As a first example, consider the case of a mobile terminated facsimile transmission call.

At step 200, a mobile terminated facsimile transmission call begins when the facsimile unit 103 initiates a call towards the PC facsimile unit 107, via the PSTN 102 and mobile switching center 101. When the PSTN 102 connects the call to the mobile switching center 101, the mobile switching center 101 determines that the call is to be a facsimile transmission call by examining the called number or through a similar identification technique. The mobile switching center 101 completes the call by connecting the first protocol convertor 104 to the PSTN 102 circuit (and, hence, the facsimile unit 103), assigns the mobile 106 to a channel, and connects the first protocol convertor 104 to the channel. Note that to establish the call, three separate communication links need to be created, which is done essentially simultaneously as outlined in step 201.

At step 201, the first protocol convertor 104 initiates communication with the facsimile unit 103 by means of a predetermined interfacing protocol. For example, assuming the facsimile unit 103 is a Group 3 device, the predetermined interfacing protocol is standardized by the CCITT T.30 protocol. The T.30 protocol specifies the procedures which permit a calling facsimile device and a called facsimile device to exchange identifications, negotiate operating parameters, and so forth. In the present invention, the first protocol convertor 104 emulates the called fax device and communicates directly, via the mobile switching center 101 and PSTN 102, with the facsimile unit 103 using the T.30 protocol. In this sense, the first protocol convertor 104 "terminates" the predetermined (T.30) interfacing protocol.

Also at step 201, the mobile 106 initiates communication with the PC facsimile unit 107 by means of a first predetermined interfacing protocol. For example, assuming the PC facsimile unit 107 is a PC running facsimile software (the combination of which is often referred to as a facsimile DTE) the first predetermined interfacing protocol might be EIA592 or EIA578. EIA592 and EIA578 are standards which specify procedures for communication between a facsimile DTE and a facsimile DCE. A facsimile DCE is classified as a communication device, such as a modem, capable of communicating with a facsimile DTE via the EIA592 or EIA578 protocols. In this situation, the mobile 106 would emulate a facsimile DCE to the PC facsimile unit 107 via the protocol convertor 114, effectively terminating the first predetermined interfacing protocol within the mobile 106. Alternatively, the PC facsimile unit 107 could be a Group 3 facsimile device. In such a case, the mobile 106, via the protocol convertor 114, and PC facsimile unit 107 would communicate using the T.30 protocol. Again, the protocol convertor 114 would serve to terminate the first predetermined interfacing protocol within the mobile 106.

The third communication link shown in step 201 establishes communications between the protocol convertor 114 within the mobile 106 and the first protocol convertor 104 using a second predetermined interfacing protocol. This second predetermined interfacing protocol is logically divided into two layers. At the lower layer, a radio link protocol (RLP) connection is established between the protocol convertor 114 and the first protocol convertor 104. The RLP allows the transfer of information between the protocol convertor 114 and the first protocol convertor 104 in data blocks, wherein each data block contains coding bits which allow the first protocol convertor 104 and the protocol convertor 114 to determine if bit errors have occurred within each data block. If a data block is found to contain bit errors, the receiver will request the sender to re-transmit the data block until the data block is received error-free. The re-transmission feature of the RLP is commonly termed an automatic repeat request (ARQ) protocol. In general, ARQ protocols ensure error-free transferral of data, but the data throughput and transfer delay exhibited by the protocol both vary as a function of the channel error rate and are thus dynamically non-constant.

The upper layer of the second predetermined interfacing protocol is a messaging protocol that supports transmission of facsimile control information between the protocol convertor 114 and the first protocol convertor 104 on behalf of the facsimile units to which they are connected. In essence, this layer allows the exchange of information related to the T.30 and/or the EIA592 or EIA578 protocols. This upper layer is termed the "in-band protocol". For example, the PC facsimile unit 107, being the called facsimile device in the current mobile terminated example, can send its called station ID to the mobile 106, using the EIA592 command +FLI="called station ID". The mobile 106 terminates the EIA592 protocol and sends the called station ID to the first protocol convertor 104 using an in-band message. The first protocol convertor 104 then transfers the called station ID to the facsimile unit 103 at the appropriate time, using the T.30 CSI frame.

Continuing with the mobile terminated example, the facsimile unit 103 ends its T.30 protocol session with the first protocol convertor 104 and proceeds with transmission of facsimile image data to the first protocol convertor 104. The format of the facsimile image data transmitted by a Group 3 fax device is standardized in the CCITT T.4 protocol. An important aspect of the T.4 standard is that T.4 data needs to be transmitted and received at a constant bit rate. Therefore, the first protocol convertor 104 must interface this constant-rate bit stream of T.4 data with the dynamically non-constant throughput provided by the RLP on the channel. If the T.4 data rate coming from the facsimile unit 103 is greater than the channel throughput, the first protocol convertor 104 will buffer the T.4 data in its memory 113. Conversely, if the T.4 data rate coming from the facsimile unit 103 is less than the channel throughput, the first protocol convertor 104 is allowed to supply image data to the RLP at less than the available channel throughput.

The transceiver 108, and hence the mobile 106, receive facsimile image data from the channel at a non-constant rate, due to the ARQ feature of the RLP, as shown at step 203. As an example of the present invention, wherein the PC facsimile unit 107 is a facsimile DTE, the non-constant rate will present no difficulties since neither the EIA592 or EIA578 standard require a constant bit rate. However, if the mobile 106 is connected to a standard Group 3 facsimile device, it is required by the standard to send T.4 data to the PC facsimile unit 107 at a constant rate, as shown at steps 207 and 208. If the channel throughput rate is greater than the T.4 data rate, the mobile 106 may, via the protocol convertor 114, buffer facsimile image data in the memory 110, or use facilities provided by the RLP to restrict the flow of data from the first protocol convertor 104 (which may in turn cause the first protocol convertor 104 to buffer T.4 data in its memory 113). Conversely, if the channel throughput rate is less than the T.4 data rate, the mobile 106 must somehow slow the actual transfer of facsimile image data to the PC facsimile unit 107 without affecting the bit rate. This is accomplished by having the protocol convertor 114 pad the line data of the facsimile image data with T.4 fill bits. To ensure a constant bit rate flow to the PC facsimile unit 107, the protocol convertor 114 would buffer a predetermined amount of facsimile image data in memory 110 at the start of the image transmission before commencing transmission of the facsimile image data to the PC facsimile unit 107.

The transmission of facsimile image data continues as described above until the facsimile information transfer is completed, as shown at step 204. The facsimile unit 103 then initiates a release of the PSTN 102 circuit such that the mobile switching center 101 de-allocates the channel and disconnects the first protocol convertor 104, thus completing the call.

As a second example, consider the case of a mobile originated facsimile transmission call. The mobile originated facsimile call begins when the PC facsimile unit 107 initiates a call to the facsimile unit 103, as shown at step 200. As an example of the present invention, wherein the PC facsimile unit 107 is a facsimile DTE and the first predetermined interfacing protocol is EIA592, the call is initiated by transmission of the EIA592 command ATD to the mobile 106. Alternatively, the PC facsimile unit 107 could be a Group 3 fax device, in which case it would initiate the call by going off-hook and sending tone or pulse dialing towards the mobile 106.

The mobile 106 then requests the mobile switching center 101 to set up a call to the facsimile unit 103. The mobile switching center 101 establishes the call by assigning the mobile 106 a channel, setting up a PSTN 102 circuit to the facsimile unit 103, and connecting the first protocol convertor 104 to the channel and the PSTN 102 circuit. Note that to establish the call, three separate communication links need to be created, which is done essentially simultaneously as outlined in step 201 and described above.

Once again, these three communication links allow the transfer of facsimile control information between the PC facsimile unit 107 and facsimile unit 103. For example, the facsimile unit 103, being the called facsimile device in the mobile originated call, can send its called station ID to the first protocol convertor 104, using the T.30 CSI frame. The first protocol convertor 104 sends the called station ID to the mobile 106 using the in-band protocol. At the appropriate time, mobile 106 transfers the called station ID, via the protocol convertor 114, to the PC facsimile unit 107, using the EIA592 response +FCI:"called station ID"

Once the transfer of facsimile control information is completed, the PC facsimile unit 107 ends its T.30 protocol session with the protocol convertor 114 and proceeds with transmission of facsimile image data to the protocol convertor 114, and hence, the mobile 106.

Similar to the first protocol convertor 104 in the mobile terminated example described above, the protocol convertor 114 must interface the constant-rate facsimile image data stream produced by the PC facsimile unit 107 with the non-constant throughput rate provided by the RLP on the channel. As an example of the present invention, wherein the PC facsimile unit 107 is a facsimile DTE, data flow control presents no difficulties since both the EIA592 and EIA578 standards provide mechanisms for the protocol convertor 114 to control the flow of data from the PC facsimile unit 107. However, if the PC facsimile unit 107 is a standard Group 3 fax device, the facsimile image data transmitted by the PC facsimile unit 107 will be constant-rate T.4 data. In this case, if the T.4 data rate is greater than the channel throughput rate, the protocol convertor 114 will buffer facsimile image data in its memory 110. Conversely, if the T.4 data rate is less than the channel throughput rate, the protocol convertor 114 is allowed to supply data to RLP, via the transceiver 108, at less than the available channel throughput rate, thus controlling the data flow.

The first protocol convertor 104 receives facsimile image data, via the base site 105, at a non-constant rate due to the ARQ feature of the RLP, as shown at step 202. The first protocol convertor 104 is required by the T.4 protocol to transmit facsimile image data to the facsimile unit 103 at a constant rate, therefore, it must adapt the non-constant rate data to the required constant rate, as shown at steps 205 and 206. If the channel throughput rate is greater than the T.4 data rate, the first protocol convertor 104 may buffer facsimile image data in its memory 113, or use facilities provided by the RLP to restrict the flow of data from the protocol convertor 114 (which may, in turn, cause the protocol convertor 114 to buffer T.4 data in its memory 110). Conversely, if the channel throughput rate is less than the T.4 data rate, the first protocol convertor 104 must slow the actual transfer of facsimile image data to the facsimile unit 103 without affecting the bit rate. This is accomplished by having the first protocol convertor 104 pad the line data of the facsimile image data with T.4 fill bits. To ensure a constant bit rate flow to the facsimile unit 103, the first protocol convertor 104 would buffer a predetermined amount of facsimile image data at the start of the image transmission before commencing transmission of facsimile image data to the facsimile unit 103.

The transmission of facsimile image data continues as described above until the facsimile information transfer is completed, as shown at step 204. The facsimile unit 103 then initiates a release of the PSTN 102 circuit such that the mobile switching center 101 de-allocates the channel and disconnects the first protocol convertor 104, thus completing the call.

Within the spirit of the invention, one skilled in the art could readily design a mobile to mobile facsimile transmission. In such a design, the mobile 106 is operably coupled, as described above, to the PC facsimile unit 107 (a PC facsimile unit or a Group 3 device) and the second mobile 115 (having the same characteristics as the mobile 106) is operably coupled to the second facsimile unit 116 (a PC facsimile unit or a Group 3 device), wherein the mobile 106 and the second mobile 115 communicate with each other via the wireless communication system. The communication between the mobiles is conducted using one of the predetermined interfacing protocols discussed above. Also discussed above, the mobiles establish communication with the respective facsimile units utilizing one of the above discussed predetermined interfacing protocols.

The present invention allows the transmission of facsimile data through a digital RF communication system between fixed-end facsimile devices and mobile facsimile devices. Using protocol convertors to terminate the control data and image data protocols unique to each facsimile device, the present invention uses a radio link protocol to ensure the error-free transmission of facsimile data. In this manner, the error and delay difficulties inherent to any RF communication system are overcome and transparent facsimile data transfer is achieved.

We claim:

1. In a wireless communication system that includes a plurality of communication units, a method for providing facsimile capabilities to at least one communication unit of the plurality of communication units, the method comprises the steps of:
   a) coupling the wireless communication system with a wireline telephone system via a first protocol converter, wherein the first protocol converter converts a predetermined interfacing protocol of the wireline telephone system to a second predetermined interfacing protocol of the wireless communication system and vice versa;
   b) coupling the at least one communication unit to a first facsimile unit, wherein the at least one communication unit converts the second predetermined interfacing protocol to one of the predetermined interfacing protocol and a first predetermined interfacing protocol of the first facsimile unit and vice versa;
   c) upon initiation of a facsimile transmission between the first facsimile unit and a second facsimile unit coupled to the wireline telephone system, establishing communication between the first protocol converter and the second facsimile unit based on the predetermined interfacing protocol;
   d) upon initiation of the facsimile transmission between the first facsimile unit and the second facsimile unit, establishing communication between the first facsimile unit and the at least one communication unit using one of the predetermined interfacing protocol and the first predetermined interfacing protocol; and
   e) upon initiation of the facsimile transmission between the first facsimile unit and the second facsimile unit, establishing communication between the at least one communication unit and the first protocol converter using the second predetermined interfacing protocol.

2. The method of claim 1 further comprises the steps of:
   f) receiving, by the first protocol converter from the at least one communication unit via the wireless communication system, a non-constant digital bit stream;
   g) storing, by the first protocol converter, the non-constant digital bit stream;
   h) when a predetermined amount of the non-constant digital bit stream is stored, transmitting, by the first protocol converter to the second facsimile unit, a substantially constant digital bit stream.

3. The method of claim 1 further comprises the steps of:
   f) receiving, by the at least one communication unit from the first protocol converter via the wireless communication system, a non-constant digital bit stream;
   g) storing, by the at least one communication unit, the non-constant digital bit stream;
   h) when a predetermined amount of the non-constant digital bit stream is stored, transmitting, by the at least one communication unit to the first facsimile unit, a substantially constant digital bit stream.

4. In a wireless communication system that includes a plurality of communication units, wherein the wireless communication system is operably coupled to a wireline telephone system, a method for interfacing at least one communication unit of the plurality of communication units with a facsimile unit, the method comprises the steps of:
   a) coupling the at least one communication unit to the facsimile unit, wherein the at least one communication unit converts one of a predetermined interfacing protocol of the wireline telephone system and a first predetermined interfacing protocol of the facsimile unit to a second predetermined interfacing protocol of the wireless communication system and vice versa; and
   b) upon initiation of a facsimile transmission, establishing communication between the at least one communication unit and the facsimile unit using one of the predetermined interfacing protocol and the first predetermined interfacing protocol.

5. The method of claim 4 further comprises the steps of:
   c) receiving, by the at least one communication unit from the wireless communication system, a non-constant digital bit stream;
   d) storing, by the at least one communication unit, the non-constant digital bit stream;
   e) when a predetermined amount of the non-constant digital bit stream is stored, transmitting, by the at least one communication unit to the facsimile unit, a substantially constant digital bit stream.

6. In a wireless communication system that includes a plurality of communication units, a limited number of wireless communication resources, a method for interfacing the wireless communication system with a wireline telephone system such that facsimile transmissions are transceivable between facsimile units affiliated with the wireless communication system and facsimile units affiliated with the wireline telephone system, the method comprises the steps of:
   a) coupling the wireless communication system to the wireline telephone system via a first protocol converter, wherein the first protocol converter converts facsimile protocol of the wireless communication system to facsimile protocol of the wireline telephone system and vice versa;

b) upon initiation of a facsimile transmission between a first facsimile unit affiliated with the wireless communication system and a second facsimile unit affiliated with the wireline telephone system, establishing communication between the first protocol converter and the second facsimile unit based on a predetermined interfacing protocol; and c) upon the initiation of the facsimile transmission between the first facsimile unit and the second facsimile unit, establishing communication between the first protocol converter and the first facsimile unit based on either the predetermined interfacing protocol or a first predetermined interfacing protocol.

7. The method of claim 6 further comprises the steps of:

f) receiving, by the first protocol converter from the wireless communication system, a non-constant digital bit stream;

g) storing, by the first protocol converter, the non-constant digital bit stream;

h) when a predetermined amount of the digital bit stream is stored, transmitting, by the first protocol converter to the second facsimile unit, a substantially constant digital bit stream.

8. An improved communication unit that couples a facsimile unit to a wireless communication system, wherein the wireless communication system is operably coupled to a wireline telephone system, the improvement comprises:

coupling means for coupling the improved communication unit to the facsimile unit; and converter means, operably coupled to the coupling means, for converting facsimile protocol of the facsimile unit to facsimile protocol of the improved communication unit based upon a predetermined facsimile protocol.

9. The improved communication unit of claim 8 further comprises data flow control means, operably coupled to the coupling means and the converter means, for controlling the flow of facsimile data between the facsimile unit and the improved communication unit, such that a non-constant data stream is received via the wireless communication system and a substantially constant data stream is provided to the facsimile unit.

10. In the improved communication unit of claim 9, the data flow control means further comprises: storage means for storing the non-constant data stream; and determination means, operably coupled to the storage means, for determining when a predetermined amount of the non-constant data stream has been stored, such that when the predetermined amount is reached, the data flow control means begins transmitting the substantially constant data stream.

11. A protocol converter that is used in a wireless communication system to interface the wireless communication system with a wireline telephone system, wherein facsimile data is transmitted between the wireless communication system and the wireline telephone system, the protocol converter comprises:

coupling means for coupling the wireless communication system to the wireline telephone system;

converter means, operably coupled to the coupling means, for converting facsimile protocol of the wireless communication system to facsimile protocol of the wireline telephone system and vice versa;

data flow control means, operably coupled to the coupling means and the converter means, for controlling flow of facsimile data between the wireless communication system and the wireline communication system such that a non-constant data stream is received via the wireless communication system and a substantially constant data stream is provided to the wireline telephone system.

12. In the protocol converter of claim 11, the data flow control means further comprises:

storage means for storing the non-constant data stream; and determination means, operably coupled to the storage means, for determining when a predetermined amount of the non-constant data stream has been stored, such that when the predetermined amount is reached, the data flow control means begins transmitting the substantially constant data stream.

13. In a wireless communication system that includes a plurality of communication units, a method for providing facsimile communication between a first facsimile unit affiliated with a first communication unit of the plurality of communication units and a second facsimile unit affiliated with a second communication unit of the plurality of communication units, the method comprises the steps of:

a) coupling the first communication unit to the first facsimile unit, wherein the first communication unit converts a second predetermined interfacing protocol of the wireless communication system to one of a predetermined interfacing protocol of the wireline telephone system and a first predetermined interfacing protocol of the first and second facsimile units and vice versa;

b) coupling the second communication unit to the second facsimile unit, wherein the second communication unit converts the second predetermined interfacing protocol to one of the predetermined interfacing protocol and the first predetermined interfacing protocol and vice versa;

c) upon initiation of a facsimile transmission between the first facsimile unit and the second facsimile unit, establishing communication between the first communication unit and the first facsimile unit using one of the predetermined interfacing protocol and the first predetermined interfacing protocol;

d) upon initiation of the facsimile transmission between the first facsimile unit and the second facsimile unit, establishing communication between the second facsimile unit and the second communication unit using one of the predetermined interfacing protocol and the first predetermined interfacing protocol; and e) upon initiation of the facsimile transmission between the first facsimile unit and the second facsimile unit, establishing communication between the first communication unit and the second communication unit based on the second predetermined interfacing protocol.

* * * * *